United States Patent [19]
Blanchfield et al.

[11] Patent Number: 5,531,536
[45] Date of Patent: Jul. 2, 1996

[54] SPLIT SLITTER

[75] Inventors: Phillip Blanchfield, Greenville; David Hiltunen, Greenleaf, both of Wis.

[73] Assignee: Carolina Knife Company, Inc., Asheville, N.C.

[21] Appl. No.: 377,463

[22] Filed: Jan. 24, 1995

[51] Int. Cl.$^6$ .............................. F16D 1/00; B65H 35/02
[52] U.S. Cl. ......................... 403/340; 403/24; 403/312; 403/344
[58] Field of Search .................................. 403/310, 312, 403/337, 340, 344, 345, 13, 24

[56] References Cited

U.S. PATENT DOCUMENTS

| | | | |
|---|---|---|---|
| 1,179,393 | 4/1916 | Barry et al. | 403/344 X |
| 4,428,697 | 1/1984 | Ruland | 403/344 |
| 5,085,535 | 2/1992 | Solberg et al. | 403/24 |

Primary Examiner—Blair Johnson
Assistant Examiner—Bruce A. Lev
Attorney, Agent, or Firm—Carter & Schnedler

[57] ABSTRACT

There is provided a cylindrical shaped slitter including first and second semicircular halves which may be connected together in only one possible way and having precision dynamic balancing. Each half has first and second mating ends. A land projects from the first mating surface of each half and a recess is received in the second mating end of each half. The recess in the first half receives the land from the second half, and the recess in the second half receives the land from the first half, thereby preventing axial and radial movement of the first and second halves relative to one another after they are connected together.

12 Claims, 4 Drawing Sheets

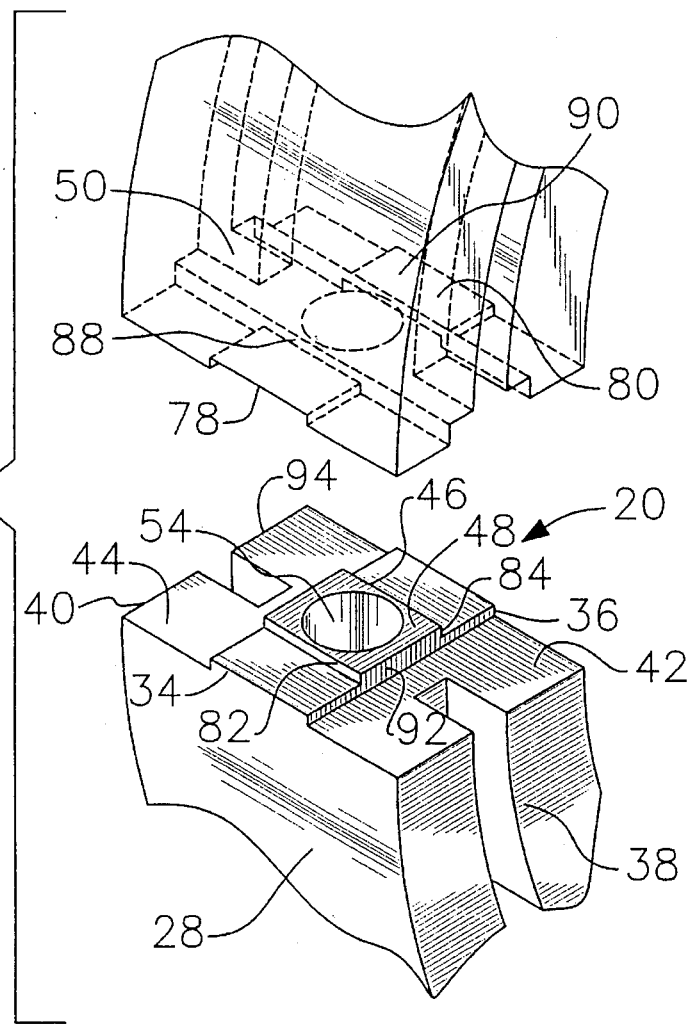
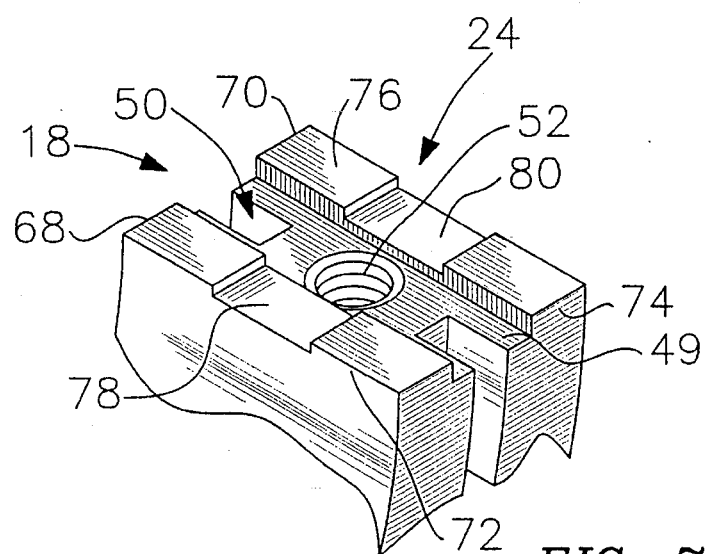

SPLIT SLITTER

BACKGROUND OF THE INVENTION

This invention relates to cylindrical shaped work members such as slitters, anvils, spacers and the like. More particularly, it relates to slitters, anvils, spacers and the like which are used to slit wide rolls of products such as paper, films and fabrics or other relatively thin materials.

Paper as a typical material is referred to herein for simplicity. When paper is manufactured at a mill, it is first formed in wide rolls which must be cut into narrower rolls by a process referred to as slitting for shipment to customers. A plurality of circular devices known as slitters are attached to a rotating shaft. Below the slitters rest so-called anvils having edges which are adjacent to, but clear of, the sharp edges of the rotating slitters. The wide web of paper passes between the edges of the slitter and the edges of the anvil whereby the paper is slit. In order for this slitting process to perform properly, the edges of the slitters must be sharpened periodically. In addition, after several sharpenings, the slitters must be replaced.

Originally, slitters were one-piece cylindrical members which were received over the shaft. When it came time to replace or sharpen a slitter, it was necessary to remove the shaft from the machine and slide the slitter off the end of the shaft. Removing the shaft from the machine required the removal of various drive belts and other parts, and replacing the belt drives and other parts when the shafts were put back in place.

More recently, two-piece slitters have been utilized so that the slitters may be removed from the shaft without the need to remove the shaft from the machine. However, it is often difficult to maintain axial and radial alignment with respect to the two halves of a two piece slitter. Misalignment of the two halves has been known to cause a poor cut, including misdirection and frayed edges on the paper.

U.S. Pat. No. 5,085,535 issued to Solberg et al teaches an improved slitter having two halves which are aligned both in the axial and radial direction. The Solberg patent, however, suffers from several deficiencies, including the fact that the halves may be put together in two different ways. Because of manufacturing variations, the two halves may fit together differently, depending on which way they are put together. Also the length of the screws and the heads of the screws which hold the halves together are located in the same half resulting in an imbalance. Therefore, there is a need to provide an improved two-piece slitter which has axial and radial alignment but which also provides a symmetrical design to enhance dynamic balancing to overcome these problems while still being commercially producible without ultra precision and high cost.

When used herein, the term slitter shall include two-piece cylindrical shaped members which may be slitters, anvils, spacers and the like which are used in the paper or film industries and which are adapted to be placed on a rotating shaft.

OBJECTS OF THE INVENTION

It is therefore one object of this invention to provide a two-piece slitter which is automatically and singularly aligned in the axial and radial direction.

It is another object of this invention to provide a two-piece slitter which is in optimum dynamic balance while rotating on a high speed shaft.

It is still another object of this invention to provide a two-piece slitter which is easy to attach to and detach from a shaft.

It is yet another object of this invention to provide an improved two-piece slitter which is very stable.

SUMMARY OF THE INVENTION

In accordance with one form of this invention there is provided a cylindrical shaped member which includes first and second substantially semicircular halves connectable to one another. Each half has a first and second mating end. The first mating end for each half includes a first surface having a land projecting therefrom. The second mating end for each half includes a second surface having a major recess therein. The major recess in the first half receives at least a portion of a corresponding land from the second half. The major recess in the second half receives at least a portion of the corresponding land from the first half. Axial and radial movement of the first and second halves is inhibited when the first and second halves are connected together.

It is preferred that each land projecting from the first mating surface be in the form of a rectilinear cap extending above a pair of ledges and that the second mating surface include four legs located in four corners adjacent to the major recess with the legs abutting against the land when the two halves are joined.

It is also preferred that a pair of counterbore holes extend respectively through each adjacent land and recess and completely through to the outer periphery curved surfaces of each half, and further that a pair of coupling screws be received in the bored holes in opposite directions from one another, thereby providing proper dynamic balance to the member while rotating.

BRIEF DESCRIPTION OF THE DRAWINGS

The subject matter which is regarded as the invention is set forth in the appended claims. The invention, itself, however, together with further objects and advantages thereof, may be better understood by reference to the following description, taken in conjunction with the accompanying drawings, in which:

FIG. 6 is a partial pictorial view of the left side of the apparatus of FIG. 2;

FIG. 7 is a partial pictorial view showing one of the mating surfaces of each half;

DESCRIPTION OF THE PREFERRED EMBODIMENT

Figure 1:
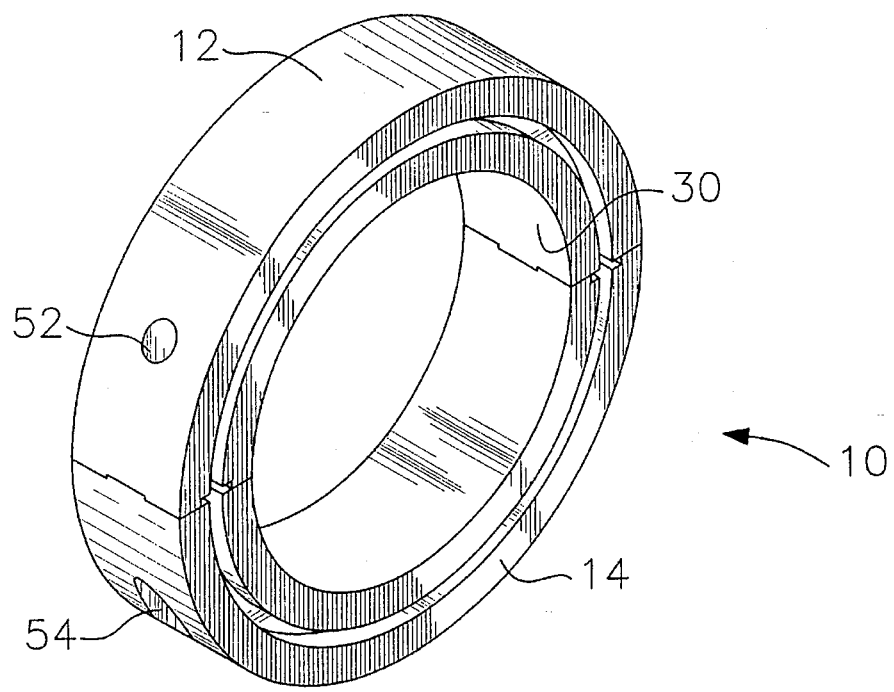
FIG. 1 is a pictorial view of the apparatus of the subject invention with the two halves mated.

Referring now more particularly to FIG. 1, there is provided cylindrical shaped member 10 which in the preferred embodiment is a slitter, but also may be an anvil, spacer or the like. However, for simplification, member 10 will hereinafter be referred to as a slitter. Slitter 10 includes first semicircular half 12 and second semicircular half 14, each of which are intermatable with one another but only in one way, as more particularly shown in FIG. 2. As can be seen from FIG. 2, if circular half 12 was rotated 180° with respect to circular half 14, the two would not intermate with one another. For simplification, only one of the interfaces between the halves 12 and 14 will be described in detail since the two interfaces are identical to one another.

Each of the circular halves include a first mating end 16 and a second mating end 18. The first mating end 16 includes a first irregular surface 19 having land 20 projecting therefrom. Second mating end 18 includes a second irregular surface 22 having a major recess 24 therein. The major recess 24 is adapted to receive at least a portion of land 20, on the opposing half, when the two halves are mated together.

As will be described in more detail below, this intermating of land 20 and major recess 24 inhibit the axial and radial movement of the first half 12 and second half 14 with respect to one another. Each half 12 and 14 includes outer curve surface 28 and inner curve surface 30. Each half 12 and 14 include opposed marginal faces 38 and 40.

Referring now to FIG. 6, each land 20 includes ledge 34 adjacent to the outer curve surface 28 and ledge 36 adjacent to the inner curve surface 30. Surface 42 is located between land 20 and face 38, and surface 44 is located between land 20 and face 40. Each land 20 includes rectilinear cap 46 extending above ledges 34 and 36. Rectilinear cap 46 includes top surface 48 for engaging with the bottom 49 of major portion 50 of recess 24.

As can be seen in FIGS. 6 and 7, bored hole 52 extends from outer curved surface 28 of mating half 12 to surface 49. Bored hole 54 extends from the outer curved surface 28 of mating half 14 through land 20. Bored hole 52 aligns with bored hole 54 at the interface of surface 48 and surface 49. Bored hole 54 receives threaded screw 56. Bored hole 54 includes shoulder 58 which abuts against the head 60 of screw 56. The threaded portion 62 of screw 56 is received in portion 64 of bored hole 54 and threaded portion 66 of bored hole 52.

Figure 2:
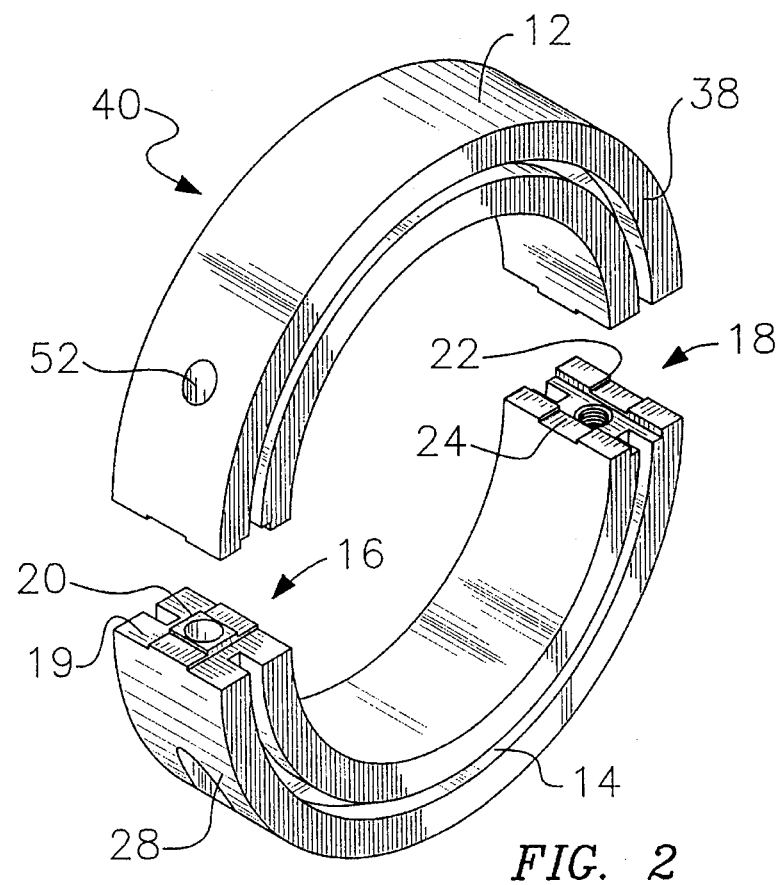
FIG. 2 is a pictorial view of the apparatus of FIG. 1, however, with their two halves unmated.
Figure 3:
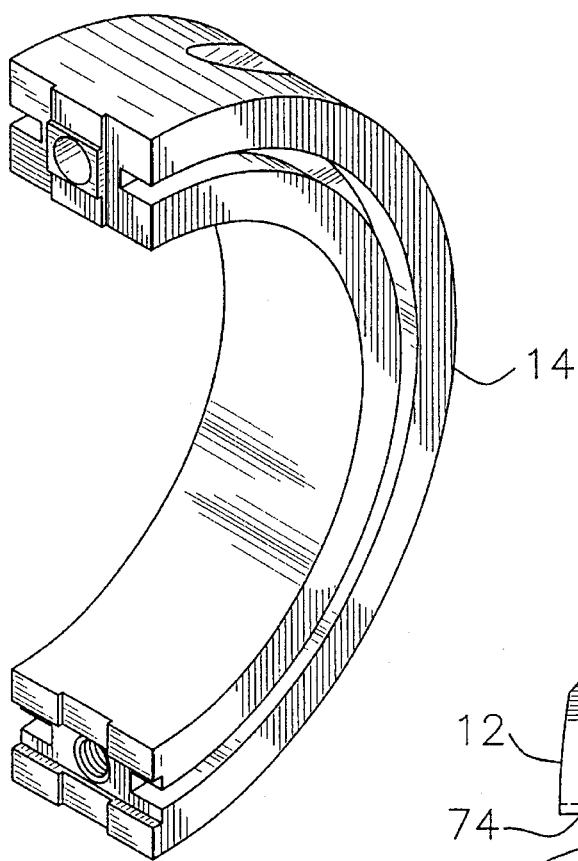
FIG. 3 is a pictorial view of either of the two halves of the apparatus of FIG. 1 showing both mating surfaces.
Figure 4:
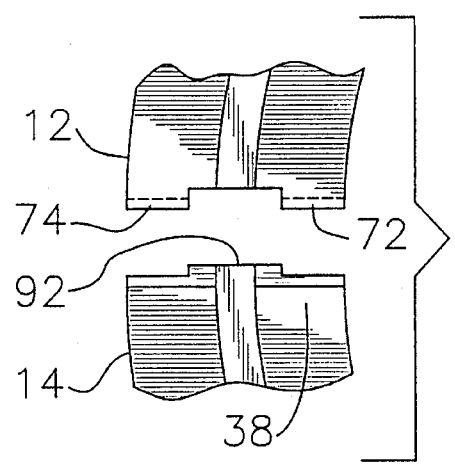
FIG. 4 is a partial side elevational view of the left side of the apparatus of FIG. 2.
Figure 5:
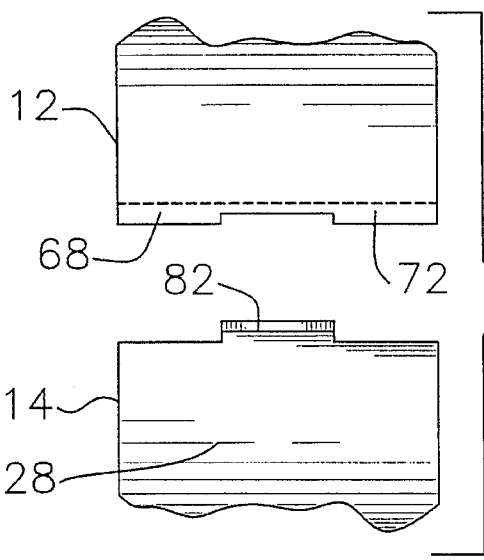
FIG. 5 is a partial front elevational view of the left side of the apparatus of FIG. 2.
Figure 8:
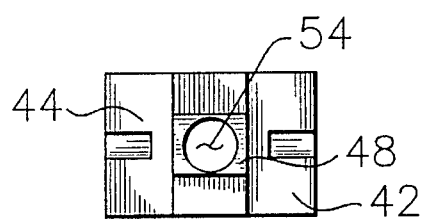
FIG. 8 is a plan view of one of the mating surfaces of each half which include the land.
Figure 9:
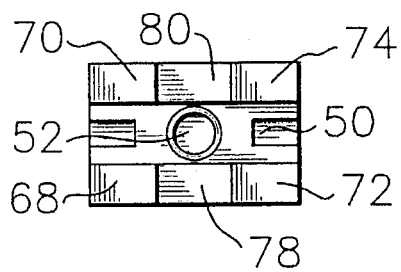
FIG. 9 is a plan view of one of the mating surfaces of each half which includes the recess.

Referring now to more particularly to FIGS. 2 and 7, the second mating surface 22 includes legs 68, 70, 72 and 74 extending therefrom. Each leg includes a bottom surface 76 for engagement with surface 42 or 44. Mating end 18 further includes minor recess 78 located between legs 68 and 72, and minor recess 80 located between legs 70 and 74. Minor recess 78 is engageable with ledge 34, shown in FIG. 6 and minor recess 80 is engageable with ledge 36, also shown in FIG. 6. Major recess 50 is deeper than the minor recesses 78 and 80.

Referring to FIG. 6, each land includes wall 82 extending above the top surface of ledge 34 and wall 84 extending above the top surface of ledge 36, each to the top surface 48 of rectilinear cap 46.

In addition, wall 88 extends from minor recess 78 to major recess 50. Wall 90 also extends from minor recess 80 to major recess 50. Wall 82 of the land engages with wall 88 of the recess and wall 84 of the land engages with wall 90 of the recess. This engagement inhibits radial movement of the first and second halves.

Each end 92 of land 20 forms a stepped shaped wall adjacent to marginal face 38 and rises from surface 42. A second identical stepped shaped wall 94 is provided on the other side of the land and rises from surface 44. Legs 72 and 74, shown in FIG. 6 engage with wall 92, and legs 68 and 70 engage with wall 94 so that the movement of the halves in the axial direction is inhibited.

In addition, with each half having a land and a recess, as opposed to the prior art where there are two lands on one half and two recesses on the other half, it is impossible to assemble the two halves together improperly.

Figure 10:
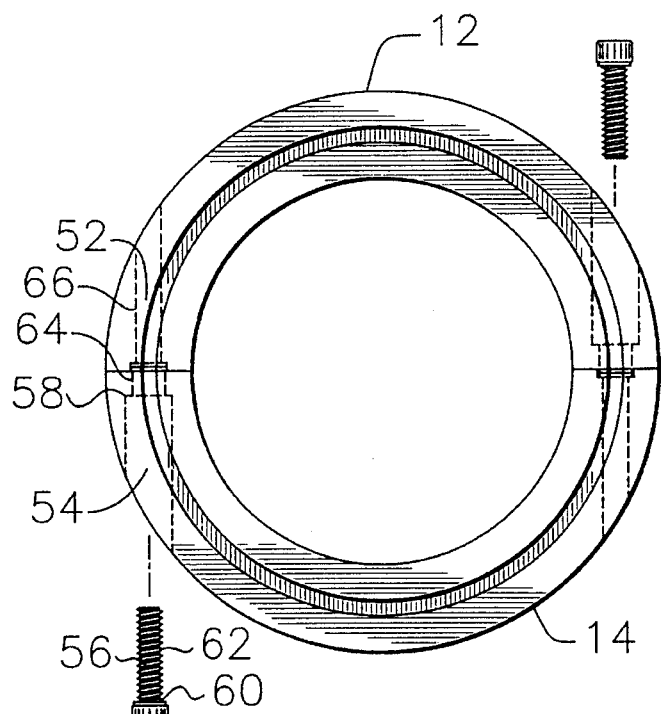
FIG. 10 is a side elevational view of the apparatus of FIG. 2 showing the threaded screws being inserted therein.
Figure 11:
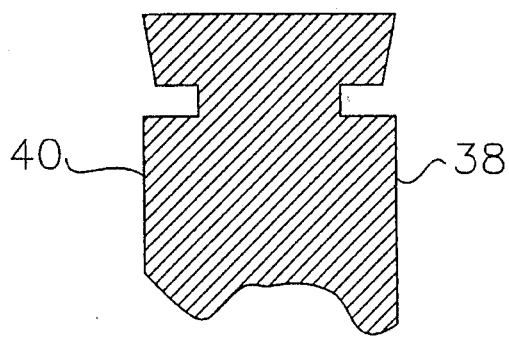
FIG. 11 is a partial side elevational view showing the cutting edges of the apparatus of FIG. 1.

As can be seen in FIG. 10, the threaded screws are inserted in opposite directions. This feature improves access and simplifies installation and removal of the slitters from the shaft and also insures optimum dynamic balance.

In addition, because the bored holes and counterbore and threading on each half extend all the way through each half, dynamic balance is inherent in the design. This balance is very important because of the high RPM rates that the slitters experience. Thus the slitters will undergo less vibration and are much safer than unbalanced slitters.

From the foregoing description of the preferred embodiment of the invention, it will be apparent that many modifications may be made therein. It will be understood, therefore, that this embodiment of the invention is intended as an exemplification of the invention only, and that the invention is not limited thereto. It is to be understood therefore that it is intended in the appended claims to cover all modifications as fall within the true spirit and scope of the invention.

What is claimed is:

1. A cylindrical shaped member comprising:

first and second substantially semi-circular halves connectable and detachable from one another; each half having first and second mating ends;

said first mating end for each half including a first surface having a land projecting therefrom;

said second mating end for each half including a second surface having a major recess therein;

said major recess in said second surface of said first half receiving at least a portion of a corresponding land from said second half;

said major recess in said second surface of said second half receiving at least a portion of said corresponding land from said first half; said first mating end of said first half being engageable with said second mating end of said second half, said first mating end of said first half not being engageable with said first mating end of said second half whereby said first and second halves may be connected together only in one way to form said cylindrical shaped member, and whereby axial and radial movement of said first and second halves is inhibited when said first and second halves are connected together;

each of said semi-circular halves including an outer curved surface and an inner curved surface;

each of said lands including a first ledge adjacent to said outer curved surface and a second ledge adjacent to said inner curved surface;

each ledge having a top surface;

each of said halves including first and second opposed marginal faces;

a first portion of said first surface of said first mating end being located between said land and said first marginal face and a second portion of said first surface of said first mating and being located between said land and said second marginal face;

said lands each including a rectilinear cap extending above said top surface of each of said ledges; said rectilinear cap from said first half including a top surface for engaging with the major portion of said recess of said second half;

each of said lands includes first and second walls respectively extending above said top surfaces of said first and second ledges; said first wall extending from said top surface of said first ledge to said top surface of said cap; said second wall extending from said top surface of said second ledge to said top surface of said cap;

each of said lands includes a first step shaped wall adjacent to said first marginal face of each of said halves rising from said first surface to said top surface of said cap and to said top surface of each of said ledges, and a second step shaped wall adjacent to said second marginal face of each of said halves rising from said first surface to the top surface of said cap and to said top surface of each of said ledges.

2. A member as set forth in claim 1, further including a bored hole extending from said top surface of each of said rectilinear cap to the outer periphery curved surface of each of said halves.

3. A member as set forth in claim 2, wherein said second mating end for each half includes first, second, third and fourth legs extending therefrom; each leg including a bottom surface for engagement with said first surface of said first mating end of the other half.

4. A member as set forth in claim 3, further including first and second minor recesses located adjacent to said major recess of said second mating end; said first minor recess adjacent to said outer curved surface; said second minor recess located adjacent to said inner curved surface; said first minor recess engageable with said first ledge of said land; said second minor recess engageable with said second ledge of said land; said major recess being deeper than said minor recesses.

5. A member as set forth in claim 4, wherein said second mating end including first and second walls extending from said minor recesses to the bottom surface of said major recess; said first wall of said land for engagement with said first wall of said recess, and said second wall of said land for engagement with said second wall of said recess thereby inhibiting the radial movement of said first and second halves.

6. A member as set forth in claim 5, wherein said first and third legs engaging with said first step shaped wall and said second and fourth legs engaging with said second step shaped wall whereby the movement of said halves in said axial direction is inhibited.

7. A member as set forth in claim 6, further including a bored hole in said bottom surface of each of said major recess extending to said outer curved surface; said bored hole in said bottom surface of said major recess aligning with said bored hole in said land.

8. A member as set forth in claim 7, wherein said bored holes extending from each of said lands to said outer curved surface each receive a threaded screw; said bored holes extending from said lands, each including a shoulder for engagement with the head of said screw, whereby said first and second halves are substantially balanced.

9. A member as set forth in claim 1, wherein said member is a slitter.

10. A member as set forth in claim 1, wherein said member is an anvil.

11. A member as set forth in claim 1, wherein said member is a spacer.

12. A cylindrical shaped member which may be used as a slitter and an anvil or a spacer comprising:

first and second substantially semi-circular halves connectable and detachable from one another; each half having first and second mating ends;

said first mating end for each half including a first surface having a land projecting therefrom;

said second mating end for each half including a second surface having a major recess therein;

said major recess in said second surface of said first half receiving at least a portion of a corresponding land from said second half;

said major recess in said second surface of said second half receiving at least a portion of said corresponding land from said first half; said first mating end of said first half being engageable with said second mating end of said second half, said first mating end of said first half not being engageable with said first mating end of said second half whereby said first and second halves may be connected together only in one way to form said cylindrical shaped member, and whereby axial and radial movement of said first and second halves is inhibited when said first and second halves are connected together;

each of said semi-circular halves including an outer curved surface and an inner curved surface;

each of said lands including a first ledge adjacent to said outer curved surface and a second ledge adjacent to said inner curved surface; each ledge having a top surface;

each of said halves including first and second opposed marginal faces;

a first portion of said first surface of said first mating end being located between said land and said first marginal face, and a second portion of said first surface of said first mating end being located between said land and said second marginal face; said lands each including a rectilinear cap extending above said top surface of each of said ledges; said rectilinear cap from said first half including atop surface for engaging with a major portion of said recess of said second half;

a bored hole extending from said top surface of each of said rectilinear caps to the outer periphery curved surface of each of said halves;

said second mating end for each half includes first, second, third and fourth legs extending therefrom; each leg including a bottom surface for engagement with said first surface of said first mating end of the other half;

first and second minor recesses located adjacent to said major recess of said second mating end; said first minor recess being adjacent to said outer curved surface; said second minor recess being adjacent to said inner curved surface; said first minor recess engageable with said first ledge of said land; said second minor recess engageable with said second ledge of said land; said major recess being deeper than said minor recesses; said lands include first and second walls respectively extending above said top surfaces of said first and second ledges; said first wall extending from the top surface of said first ledge to said top surface of said cap; said second wall extending from the top surface of said second ledge to said top surface of said cap; said second mating end including first and second walls extending from said minor recesses to the bottom surface of said major recess; said first wall of said land for engagement with said first wall of said recess and said second wall of said land for engagement with said second wall of said recess thereby inhibiting the radial movement of said first and second halves;

each of said lands includes a first step shaped wall adjacent to said first marginal face of each of said halves rising from said first surface to said top surface of said cap and to said top surface of each of said ledges, and a second step shaped wall adjacent to said second marginal face of each of said halves rising from said first surface to said top surface of said cap and to said top surface of each of said ledges; said first and third legs engaging with said first step shaped wall and said second and fourth legs engaging with said second step shaped wall whereby the movement of said halves in the axial direction is inhibited;

a bored hole in said bottom surface of each of said major recesses extending to said outer curved surface; said bored hole in said bottom surface of said major recess aligning with said bored hole in said land; said bored holes extending from each of said lands to said outer curved surface each adapted to receive a threaded screw; said bored holes extending from said lands each including a shoulder for engagement with the head of said screw whereby said first and second halves are substantially balanced.

* * * * *